Sept. 8, 1959 E. GEILENBERG 2,903,122
CONVEYING APPARATUS
Filed March 11, 1957 4 Sheets-Sheet 1
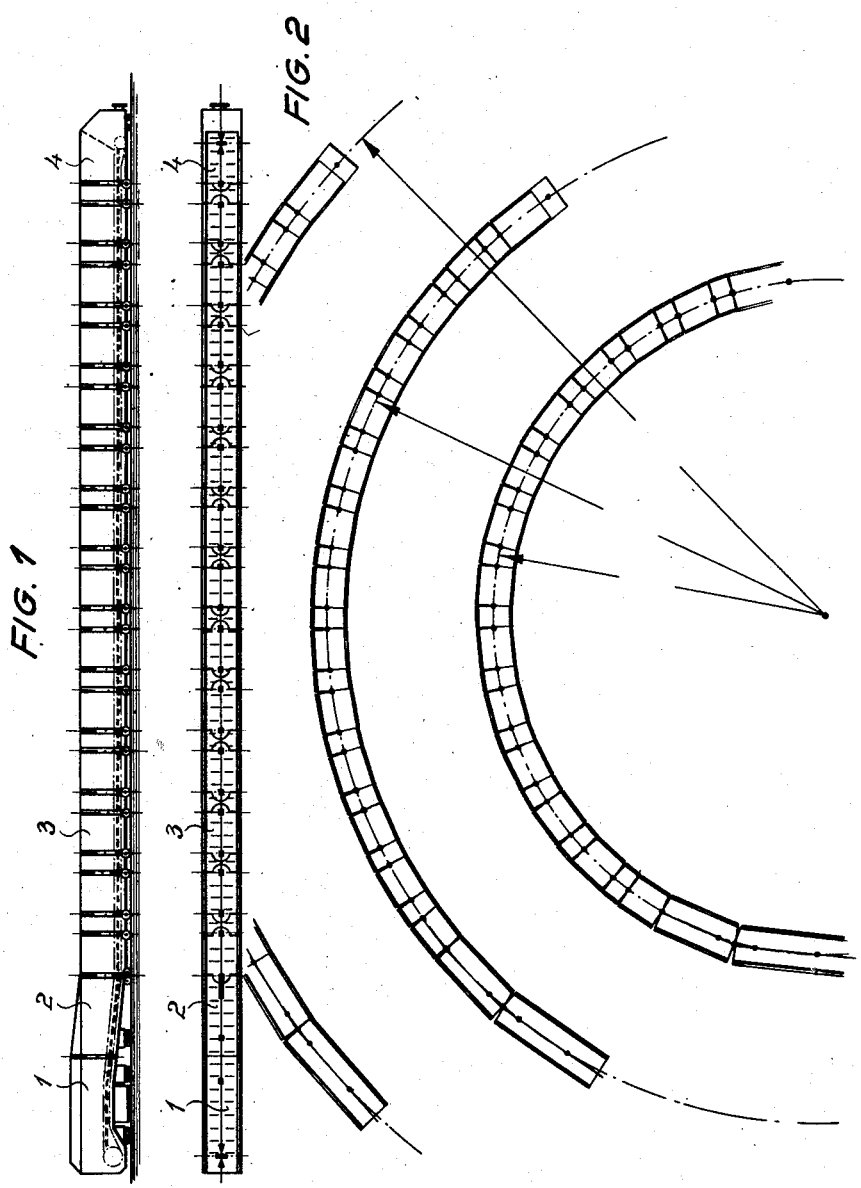
E. GEILENBERG INVENTOR Sept. 8, 1959  E. GEILENBERG  2,903,122
CONVEYING APPARATUS
Filed March 11, 1957  4 Sheets-Sheet 2
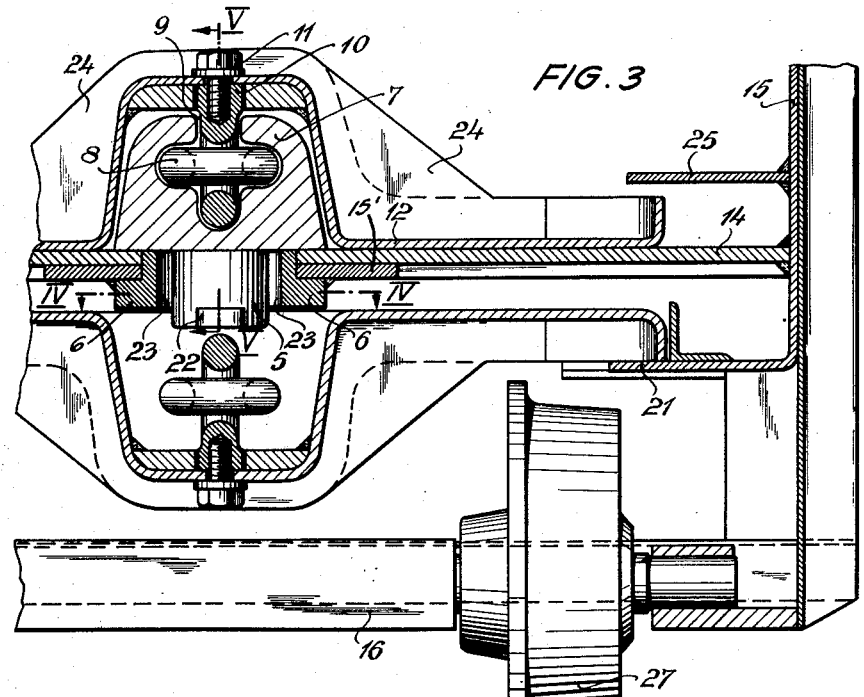
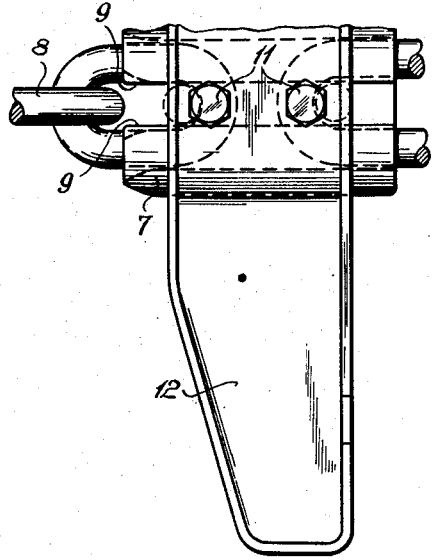
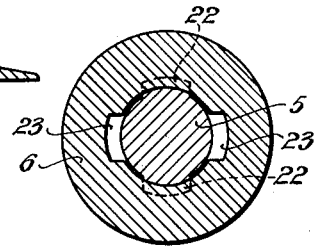
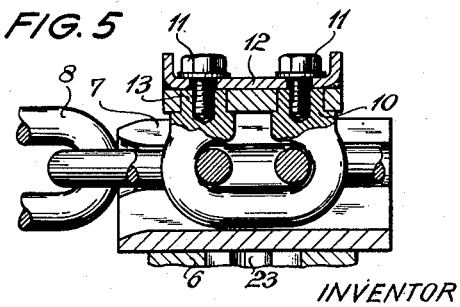
INVENTOR
E.G EILENBERG Sept. 8, 1959 E. GEILENBERG 2,903,122
CONVEYING APPARATUS
Filed March 11, 1957 4 Sheets-Sheet 3
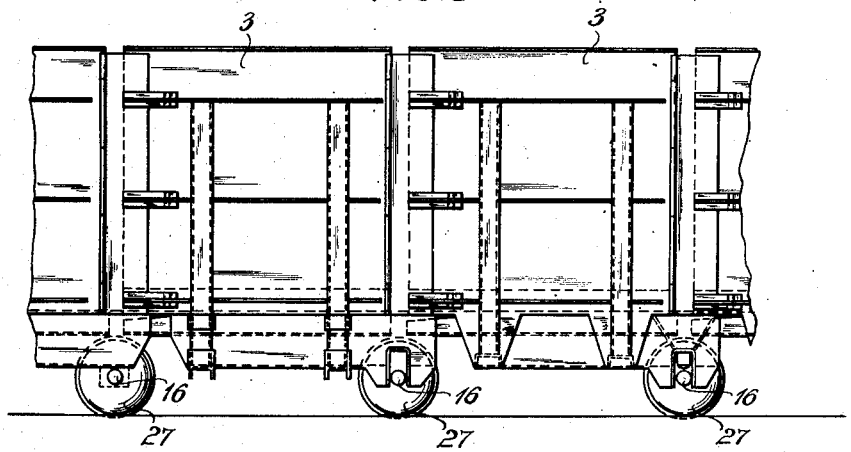
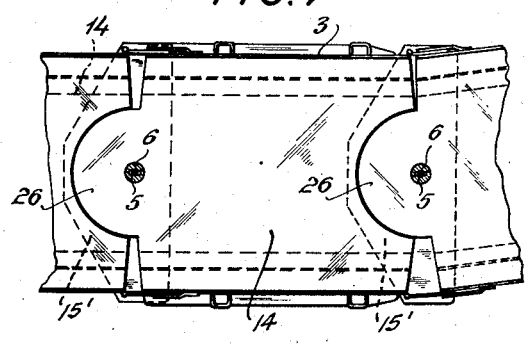
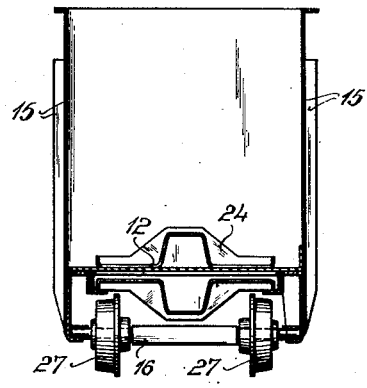
INVENTOR
E. GEILENBERG
Wenderoth, Lind & Ponack Attys Sept. 8, 1959  E. GEILENBERG  2,903,122
CONVEYING APPARATUS
Filed March 11, 1957  4 Sheets-Sheet 4
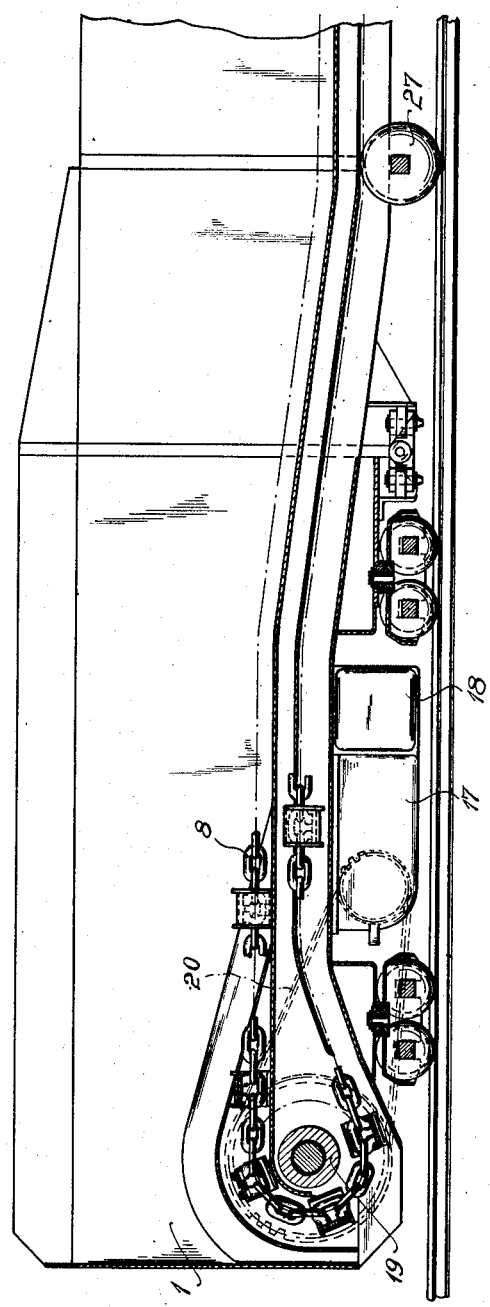
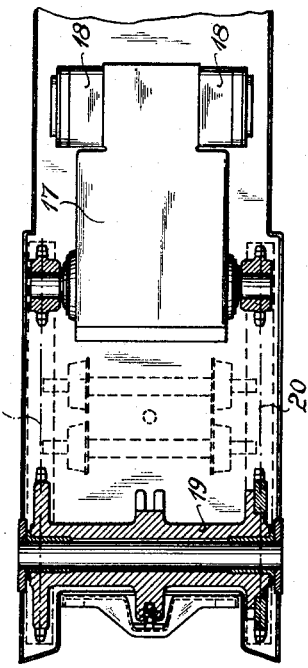
INVENTOR
E. GEILENBERG

United States Patent Office 2,903,122
Patented Sept. 8, 1959

2,903,122
CONVEYING APPARATUS

Edmund Geilenberg, Salzgitter-Bad, Germany, assignor to Salzgitter Maschinen Aktiengesellschaft, Salzgitter-Bad, Germany Application March 11, 1957, Serial No. 645,141

Claims priority, application Germany March 12, 1956

1 Claim. (Cl. 198—109)

This invention concerns an improved conveying apparatus and more particularly relates to an articulated conveying apparatus able to adopt a curved course, for use in mining and tunnelling operations, which is also transportable and which, compared with the previously known conveying machinery, possesses the advantages hereinafter mentioned.

The conveying apparatus of the present invention is able to travel in a curved path up to a minimum radius of 10 metres and at the bend can be stationary or travelling. It can also alter its curvature as desired during the conveying operation, and may be transported on rails, rubber-tyred wheels or caterpillar tracks. It can, therefore, serve also as a means of transportation.

Transportable, articulated conveying devices are already known. Known devices, however, cannot be transported during the conveying operation and also cannot convey in a curved path.

According to the present invention, in a conveying apparatus, particularly for mining and tunnelling operations, the separate sections comprising a stationary or transportable arrangement are coupled together by means of vertical bolts which simultaneously serve as a guide for a centrally located endless conveying means.

One embodiment of the invention is shown by way of example in the accompanying drawings, in which:

Fig. 1 shows diagrammatically in side elevation an assembled train of tubs;

Fig. 2 is a plan view of the arrangement shown in Fig. 1, together with representations of the radii of curvature which are possible;

Fig. 3 is a section, to a larger scale, through the coupling device, between adjacent sections;

Fig. 4 is a horizontal sectional detail taken along the line IV—IV of Fig. 3;

Fig. 5 is a vertical sectional detail taken along the line V—V of Fig. 3;

Fig. 6 is a plan view of the detail shown in Fig. 5;

Fig. 7 is a diagrammatic representation of the coupling between adjacent tubs;

Fig. 8 is a section through a tub according to the arrangement of Fig. 9;

Fig. 9 is a side elevation of several tubs with different axle mountings;

Fig. 10 is a longitudinal section of the driving mechanism of the tub train, associated parts being shown diagrammatically, and Fig. 11 is a horizontal section through the driving mechanism illustrated in Fig. 10.

The conveying apparatus according to the invention, as may be seen from Fig. 1, consists of the driving section, the transition section 2 joining the individual portions or tubs 3 to the drive, and a reversing section 4. In Fig. 2 the conveying apparatus is shown in plan view. The whole apparatus can be arranged in a radius of curvature of from 10 to 20 metres during the loading operation, this radius being changed as desired to the left or right.

The separate parts of the conveying apparatus are coupled together by vertical bolts 5 (Figs. 3 and 4). The bolts are formed on their underside with two opposed coupling noses 22. The individual parts of the conveying apparatus have openings 23 which correspond to the diameter of the bolts 5 and the two opposed coupling noses 22 (see Fig. 4). By inserting the coupling bolts 5 through the coupling opening 23 and turning the bolts 5 through approximately 90°, coupling together of two members of the conveying apparatus is effected, as in a bayonet connection.

On the upper part of each bolt 5, which in addition to forming a coupling, acts at the same time as a pivot point for radiusing the apparatus, is arranged a guide member 7 for carrying the conveying means 8. The latter, as shown by way of example in the illustrated embodiment, may be a round-link chain. By means of members 7, guiding of the conveying chain 8 from pivot point to pivot point is effected. The conveying means 8 is disposed along the central longitudinal axis of the conveying apparatus and therefore does not undergo any elongation or contraction during the conveying operation, due to the various curvatures of the apparatus which are met in practice. According to the invention, the guides 7 of the conveying means 8 can be so arranged that the guiding is effected continuously from one coupling bolt 5 to the next.

The short guide members 7 on the bolts 5 are shaped, for example, as a double-T guide for the round-link chain shown. The guide members are open at the top to form guide slots 9 (Fig. 3). Projecting coupling pins 10, in which are provided screw couplings 11 for engaging parts of the conveying members 12, extend into the open guide slots 9. The engaging parts of conveying members 12 are fastened by, for example, mortise joints 13 and screw couplings 11 to the conveying means 8.

The engaging members 12 may be, for example, scraper elements which would simultaneously cover the guide slots 9 and the openings 23. The material being conveyed is carried along by means of scraper elements or carrier plates 24. The engaging members 12 may travel with sliding friction on a base 14 of the conveying apparatus, or be moved by means of rolling friction. The sliding surfaces or the rolling surfaces may be separated from the side walls 15 of the apparatus by overlapping cover sheets 25, thereby preventing the coarser material being conveyed from entering the space between the sheets 25 and the base plates 14.

The individual parts 1 to 4 of the conveying apparatus, which are coupled together by the bayonet joints 5, 6, previously described, are constructed so that the overlapping portions 26 of the base plates 14 of the separate containers 3 are semicircular in shape (Fig. 7), so that when travelling round the curves, no openings are formed between the individual containers.

As shown in Fig. 7 one of the base plates 14 has secured thereto a plate 15' which extends under the adjacent plate 14. The sleeve 6 provides the pivot point for adjacent plates 14 and they are coupled together when the bolt 5 is rotated 90° to lock sleeve 6 in position.

The axles 16 for carrying the chassis, and the coupling points between individual containers 3 of the conveying apparatus are arranged in the same vertical plane, in order to avoid transverse longitudinal oscillation of the conveying apparatus when traversing uneven floors.

For driving or actuation of the conveying chain 8 a transmission gearing 17 (Figs. 10 and 11) is arranged under the upper and lower runs of the chain, which gearing is driven symmetrically by two motors 18. An intermediate drive from the gearing 17 to the driving drum 19 of the conveying chain 8 is effected by means of two laterally symmetrical chain drives 20.

I claim:

A conveying apparatus comprising a plurality of separate sections, a plurality of connecting bolts having guiding means thereon, an endless movable conveying means contained centrally within and throughout said sections, a driving mechanism located beneath said conveying means, said bolts being arranged as vertical connecting and pivoting members for said separate sections to couple them pivotally together and simultaneously acting as guides for said endless conveying means as it is moved by said driving mechanism through said sections, and each separate section being mounted on wheels with the axles thereof arranged vertically beneath said bolts.

References Cited in the file of this patent

UNITED STATES PATENTS

| | | |
|---|---|---|
| 2,109,923 | Lemmon | Mar. 1, 1938 |
| 2,245,113 | Meyer | June 10, 1941 |
| 2,368,414 | Eggleston | Jan. 30, 1945 |
| 2,381,108 | Cartlidge | Aug. 7, 1945 |
| 2,525,555 | Manierre | Oct. 10, 1950 |
| 2,543,368 | Jones et al. | Feb. 27, 1951 |
| 2,799,388 | Wilson | July 16, 1957 |

FOREIGN PATENTS

| | | |
|---|---|---|
| 1,068,771 | France | Feb. 10, 1954 |